(12) United States Patent
Ellis

(10) Patent No.: US 8,705,064 B2
(45) Date of Patent: Apr. 22, 2014

(54) BROADCAST SECURE PRINTING SYSTEM

(75) Inventor: Jeffrey D. Ellis, Welwyn Garden City (GB)

(73) Assignee: Xerox Corporation, Norwalk, CT (US)

( * ) Notice: Subject to any disclaimer, the term of this patent is extended or adjusted under 35 U.S.C. 154(b) by 1471 days.

(21) Appl. No.: 11/513,741

(22) Filed: Aug. 31, 2006

(65) Prior Publication Data
US 2008/0055627 A1 Mar. 6, 2008

(51) Int. Cl.
*G06K 15/00* (2006.01)

(52) U.S. Cl.
USPC .......... 358/1.14; 358/1.15; 358/1.1; 358/400; 400/61; 709/201; 709/203

(58) Field of Classification Search
USPC .............. 358/1.1, 1.14, 1.15, 1.16, 302, 1.13; 709/203
See application file for complete search history.

(56) References Cited

U.S. PATENT DOCUMENTS

| | | | | |
|---|---|---|---|---|
| 5,907,675 | A * | 5/1999 | Aahlad | 709/203 |
| 5,995,723 | A * | 11/1999 | Sperry et al. | 358/1.15 |
| 5,999,707 | A * | 12/1999 | Taniguchi et al. | 358/1.15 |
| 6,160,629 | A * | 12/2000 | Tang et al. | 358/1.1 |
| 6,822,754 | B1 * | 11/2004 | Shiohara | 358/1.15 |
| 6,872,015 | B2 * | 3/2005 | Roosen et al. | 400/61 |
| 7,206,092 | B2 * | 4/2007 | Honma | 358/1.15 |
| 7,286,250 | B2 * | 10/2007 | Kujirai et al. | 358/1.15 |
| 7,394,558 | B2 * | 7/2008 | Stringham | 358/1.15 |
| 7,612,901 | B2 * | 11/2009 | Asahara | 358/1.14 |
| 2002/0171868 | A1 | 11/2002 | Yoshimura et al. | |
| 2003/0167336 | A1 | 9/2003 | Iwamoto et al. | |
| 2003/0227641 | A1 * | 12/2003 | Edmonds et al. | 358/1.13 |
| 2004/0021893 | A1 * | 2/2004 | Stevens et al. | 358/1.15 |
| 2005/0015595 | A1 | 1/2005 | Edwards et al. | |
| 2006/0007469 | A1 * | 1/2006 | Uruma | 358/1.14 |
| 2006/0077456 | A1 * | 4/2006 | Aoki | 358/1.15 |
| 2006/0244993 | A1 * | 11/2006 | Konnai | 358/1.15 |
| 2007/0188819 | A1 * | 8/2007 | Liao | 358/302 |

OTHER PUBLICATIONS

U.S. Appl. No. 11/347,871, filed Feb. 6, 2006, Ragnet, et al.
U.S. Appl. No. 11/348,423, filed Feb. 6, 2006, Ciriza, et al.
U.S. Appl. No. 11/348,422, filed Feb. 6, 2006, Ciriza et al.

* cited by examiner

*Primary Examiner* — David K. Moore
*Assistant Examiner* — Ashish K Thomas
(74) *Attorney, Agent, or Firm* — Fay Sharpe LLP

(57) ABSTRACT

A secure printing method includes providing a user terminal with a user interface. The user terminal and interface enable a user to select a secure printing mode for printing a document. In the secure printing mode, a secure print job stored in the user terminal is released through execution of a secure release procedure. In this way, the document can be printed at a selected one of a plurality of designated printers. When a user selects the secure printing mode, page description language data for the secure print job is generated in a format, or multiple formats, compatible with the designated printers. The page description language data is stored at the user terminal and a request is communicated to each of the designated printers. The request identifies the secure print job, but the job itself is not transmitted with the request. When the predefined secure release procedure is executed, the secure print job is released to a selected printer.

18 Claims, 3 Drawing Sheets

BROADCAST SECURE PRINTING SYSTEM

CROSS REFERENCE TO RELATED PATENTS AND APPLICATIONS

The following copending applications, the disclosures of which are incorporated herein in their entireties by reference, are mentioned:

U.S. patent application Ser. No. 11/347,871, filed Feb. 6, 2006, entitled SECURE PRINTING VIA A WIRELESS INTERNET SERVICE, by Ragnet, et al.;

U.S. patent application Ser. No. 11/348,423, filed Feb. 6, 2006, entitled MOBILE DEVICE-ENABLED SECURE RELEASE OF PRINT JOBS, by Ciriza et al., U.S. patent application Ser. No. 11/348,422, filed Feb. 6, 2006, entitled MOBILE DEVICE-ENABLED SECURE RELEASE OF PRINT JOBS USING PARALLEL DECRYPTION, by Ciriza et al.

BACKGROUND

The exemplary embodiment relates to the printing arts. It finds particular application in connection with a system comprising multiple printers in which documents to be printed are securely stored in print ready format at a user's terminal for later access and printing by the user at any one of the printers. However, the following is amenable to other like printing methods and apparatuses.

While methods exist for ensuring that documents remain relatively secure from unauthorized access while stored on a user's computer or network server, there is often relatively little security once the user elects to print a document and his or her personal computer sends the document as a print job to a network printer. This is typically a file in a page description language (PDL) such as PostScript, which is communicated from the personal computer to the network printer. The print job is placed in a print job queue, and the printer processes the queued print jobs on a first-in-first-out (FIFO) or other ordering basis. While awaiting printing, the PDL resides at the printing device, which may be remote from the user, presenting opportunities for data theft. The physical printed sheets present another security risk. The person who generated the print job may not be present at the printing device when the physical printed sheets are generated, providing another opportunity for theft.

Some printing systems allow a user to send a document to a printer and then initiate printing by entering a code when the user arrives at the printer so that the user can ensure that the document is not printed until he or she can be physically present. However, such systems still create information security risks in that the document may be retrieved from the printer memory by an unauthorized user. Additionally, a user may wish to be able to print the print job at an as yet undetermined one of several printer locations. The user may not know where the printed document will be required, but may wish to be able to print the document at a location when he does not have access to his terminal, for example, during a meeting to be held later in the day. If the document were to be sent to multiple printers, the document could be retrieved from any one of the designated printers by an unauthorized user prior to the time that the document is erased from the printers' memory.

INCORPORATION BY REFERENCE

U.S. Publication No. 20050015595, published Jan. 20, 2005, entitled SYSTEM AND METHOD FOR SECURELY CONTROLLING COMMUNICATIONS, by Keith W. Edwards, et al., discloses a system and method for enabling arbitrary components to control communications without having or requiring prior knowledge of each other. The system includes a first component that creates controller objects and provides the objects to other components. The controller objects include instructions which when executed by the other components enable the components to generate user interfaces for controlling the first component. Further, the controller objects are encrypted and are used to authenticate the senders or receivers of the objects.

US Publication No. 20040021893, published Feb. 5, 2004, entitled SYSTEM FOR ENABLING A GROUP OF PRINTERS TO PRINT A DOCUMENT, by Chad A. Stevens, et al., discloses a computing system including a group of retention printers and a computer all connected to a network system. The retention printers are logically organized into a plurality of subgroups. The computer provides a user interface that enables a user to select a subgroup and to request a document be retained at each printer in the selected subgroup. The computer is responsive to the request by transmitting a retention job that describes the document to each one of the printers in the selected subgroup.

BRIEF DESCRIPTION

In aspects of the exemplary embodiment disclosed herein, a secure printing method includes providing a user terminal with a user interface which enables a user to select a secure printing mode for printing a document, wherein in the secure printing mode, a secure print job stored in the user terminal is releasable through execution of a secure release procedure for printing at a selected one of a plurality of designated printers. When a user selects the secure printing mode, the method includes generating page description language data for the secure print job in a format compatible with the designated printers, storing the page description language data at the user terminal, and communicating a request, which identifies the secure print job, to each of the designated printers. When the predefined secure release procedure is executed, the secure print job is released to a selected printer.

In another aspect, a secure printing system includes a user terminal and a group of printers in communication with the user terminal. Each of the printers is capable of executing a print job. Each of the printers includes a print job retrieval module for receiving a request for secure printing of the print job from the user terminal and for retrieving the print job from the user terminal in response to input of a secure release code. The user terminal includes a user interface which enables a user to designate a plurality of the group of printers for secure printing by a selected one of the designated printers and to establish the secure release code.

In another aspect, a secure printing method includes designating a plurality of printers from a group of printers accessible to a user terminal. Page description language data is generated for a print job in a plurality of page description language formats whereby for each of the designated printers, page description language data is generated in a compatible format. A request is sent to each of the designated printers. The request identifies the print job. A secure release procedure is established whereby the print job is released to a printer selected from the designated printers. The secure release procedure for a selected printer is executed and, in response to execution of the secure release procedure, the page description language data for the print job in the compatible format is retrieved from the user terminal.

DETAILED DESCRIPTION

Aspects of the exemplary embodiment relate to a system and method for secure printing. When a user selects a document for printing, a print job is generated on a computer terminal of a network in print-ready format. The user may select a secure printing mode which allows the user at a later time to choose a printer from a designated group of printers. In the secure print mode, the print job is retained on the computer terminal and a message sent to the designated printers. The message is placed in the print queue of each designated printer. When the user wishes to print the document on a selected printer, the selected printer retrieves the print job from the user's terminal. The exemplary system has advantages over prior systems in that the print job can be retained on the user's terminal as a print ready file or files and thus is not stored at the printers or elsewhere on the system where it may be less secure.

Figure 1:
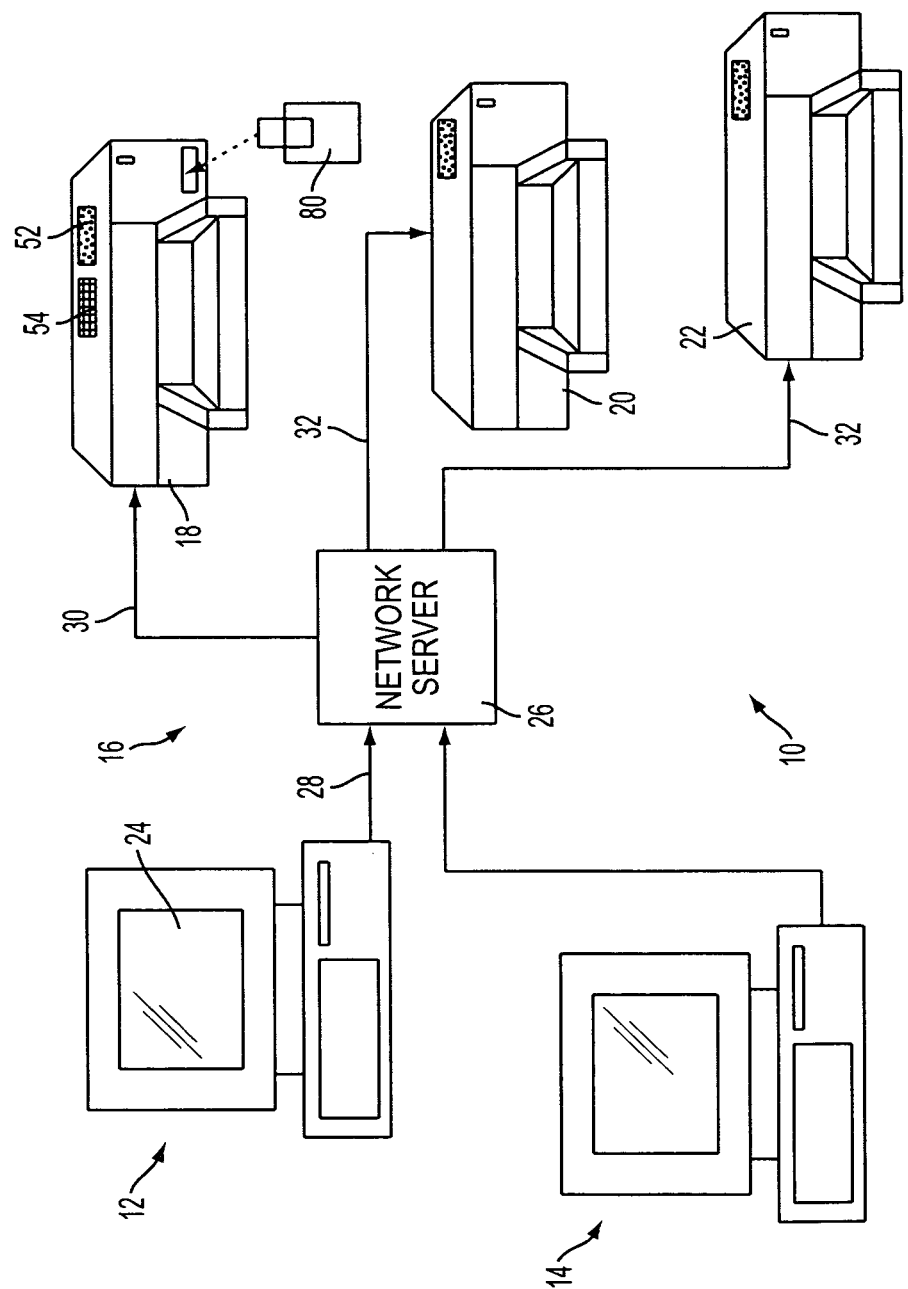
FIG. 1 is a functional block diagram of a computer system for secure printing of documents in accordance with one aspect of the exemplary embodiment.

With reference to FIG. 1, a network printing system 10 includes at least one (and generally several) user terminals 12, 14 linked by a common network 16 to a plurality of printers 18, 20, 22. The printing system 10 may serve an office, a corporation, or the like, with printers 18, 20, 22 being distributed at various locations throughout a building, or otherwise remotely located. While three printers are shown by way of example, it is to be appreciated that any number of printers may be linked to the network, such as two, four, six or more printers. The user terminal 12 enables a user to create, edit, or otherwise prepare or generate a document, such as a word processing document, spreadsheet document, slideshow presentation document, desktop publishing document, or the like. User terminal 14 may be similarly configured.

The user terminal 12 can be a network terminal, workstation, laptop computer, personal digital assistant, or the like having a wired or wireless network connection, or the like running suitable software. The illustrated user terminal 12 is a personal computer executing software such as word processing software, spreadsheet software, presentation editing software, desktop publishing software, or the like, that is suitable for preparing the document. The user terminal may include various input devices such as a keyboard, mouse, trackball, or the like, and various output devices such as a video display 24, audio speakers, indicator lamps, and so forth.

The network 16 can be a wired or a wireless network and may include a print server 26 which communicates between the user terminal 12 and the printers. For example, the network includes a first network connection 28 operatively connecting the terminal 12 with the network server 26, and second, third, and fourth network connections 30, 32, 34 which operatively connect the network server 24 with the printers 18, 20, 22, respectively. The network connections 28, 30, 32, 34 may each be a wired network connection; however, a wireless network connection such as a LAN or WLAN connection is also contemplated. In some embodiments, the digital network 16 may incorporate the Internet for communication between two local area networks associated with the terminal 12 and one or more of the printers, respectively. The printers 18, 20, 22 are typically located away from the user terminal 12. For example, the user terminal 12 may be in the user's office or cubicle, while the printers 18, 20, 22 may be in different locations, such as next door to the user's office or cubicle, elsewhere on the same floor as the user's office or cubicle, on a different floor from the user's office or cubicle, or in a different building or city than the user's office or cubicle.

One or more of the printers 18, 20, 22 can be a multifunction device including printing, copying, facsimile, scanning, bookmaking, and/or other functional capabilities. In other embodiments, one or more of the printers may be a more basic device with a single marking engine providing only printing capabilities, or may be a more sophisticated printer including, for example, a print station controller that drives one or more local marking engines and providing a plurality of different sheet processing pathways and capabilities. The exemplary marking engines of the printers may apply a marking material, such as ink or toner, to a print medium, such as sheets of paper, to form images on the print media, generally referred to as printing. The printers 18, 20, 22 may be xerographic printers, thermal printers, inkjet printers, or a combination of different types of printer. "Print jobs" generally include a plurality of digital "pages" to be rendered as one or more copies on a set of associated sheets of print media, each page, when rendered, constituting the front or back side of a sheet.

Figure 2:
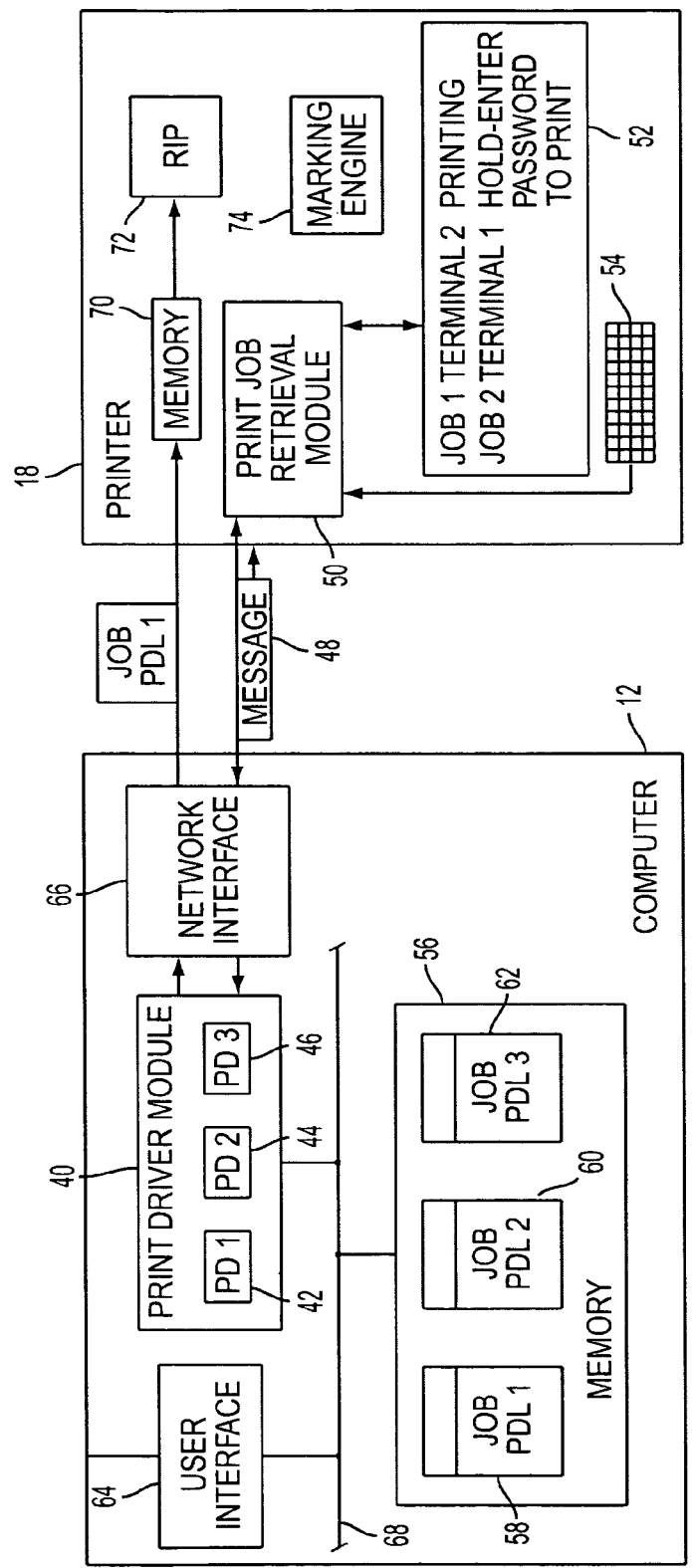
FIG. 2 is a functional block diagram of part of the computer system of FIG. 1.

With reference now to FIG. 2, the user terminal 12-includes a print driver module 40 comprising a plurality of print drivers (PD1, PD2, PD3) 42, 44, 46, depending on the number of unique types of printer in the network 16. The print drivers each comprise instructions executing on the user terminal 12 that generate page description language (PDL) data corresponding to the print job and describing content layout of one or more pages to be printed. The PDL data describes the layout of each page of graphics, text, or other content to be printed. In some embodiments, the PDL data is Postscript data. In some embodiments, the PDL data is HPGL data, PCL data, or another standard PDL format. It is also contemplated for the PDL data to be in a lower-level format, such as rastered bitmap data. Each print driver 42, 44, 46 utilizes an appropriate PDL which is understood by the printer associated with the particular driver. For example, in the illustrated embodiment, all three printers are different and thus a first print driver 42 is configured for the first printer 18, a second print driver 44 is configured for the second printer 20, and a third print driver 46 is configured for the third printer 22. However, it is to be appreciated that a print driver may be configured for two or more printers in the network.

The user is typically at the user terminal 10 when the user generates the print job. Accordingly, if the print job were to immediately print, a security risk would present itself as someone other than the user could view the printed sheets before the user travels over to the printing system 12 and picks the sheets up. Similarly, if the print job is queued for later printing (for example, if the printer has a backlog of print jobs to process from the user and from other users) then the user may again be elsewhere when the printer 18, 20, 22 prints the print job. Additionally, the user may wish to designate several of the printers where the print job can be printed, allowing the user to print the print job at a selected one at a later time. If the print job were sent to each of the printers, this may present a security risk in that it is stored in the printer's memory.

In the exemplary embodiment, the user interface is configured for user selection of a secure printing mode. The print driver module 40 is configured for sending a message 48 to one or more designated printers of the printers 18, 20, 22 when a user selects to employ the secure printing mode. The message may include information about the print job, typically the type of information which would be provided in the PDL file header, including the IP address of the user terminal which sent the message, and information from which a user can identify the job, such as its filepath. The message 48 may be received by a print job retrieval module 50 in the printer and placed in the print job queue along with normal print jobs. The module 50 may comprise a suitable data processing device, such as a computer chip or the like, which executes instructions stored in an associated memory, such as RAM or ROM memory. The module 50 may form a part of the processing component of the printer (the digital front end or interface platform) or may be a separate module. Information derived from the message 48 may be displayed along with information about other print jobs on a display 52 associated with the printer. The display 52 may be a touch screen or be associated with a keypad 54 or other user interface whereby a user can interact with the display to view the print jobs in the queue and select the job for printing. When the message 48 is sent, the print job itself is retained by the user terminal 12. In particular, as illustrated in FIG. 2, the print job is retained in memory 56 in the user terminal 12, or accessible thereto, as a PDL data file 58, 60, 62 in the appropriate PDL for each of the types of designated printer. The memory 56 may represent any type of computer readable medium such as random access memory (RAM), read only memory (ROM), magnetic disk or tape, optical disk, flash memory, or holographic memory. In general, the PDL files are stored in volatile memory. In some embodiments, the print driver module 40 and memory 56 may be combined in a single chip.

The user's terminal may include several other conventional computing components, including a user interface 64, linked to the screen, keyboard, mouse, etc., a network interface 66, which allows the computer to communicate with other devices via the computer network, such as a modulator/demodulator (MODEM), and other conventional computing components. The various components of the computer 12 may be all connected by a bus 68. As will be appreciated, FIG. 2 is a high level functional block diagram of only a portion of the components which are incorporated into a computer system 10. Since the configuration and operation of programmable computers are well known, they will not be described further.

The print job retrieval module 50 is configured for communicating with the print driver module 40, when a user elects to print the document at that printer, in order to retrieve the print job in the appropriate format for printing. The print job 58, 60, or 62 is stored in memory 70 and subjected to raster image processing (RIP) by suitable processing components ready for printing on an associated marking engine or engines 74. The print driver module 40 is also configured for sending a message no others of the designated printers to delete the original message 48 from the respective print job retrieval modules 50.

Figure 3:
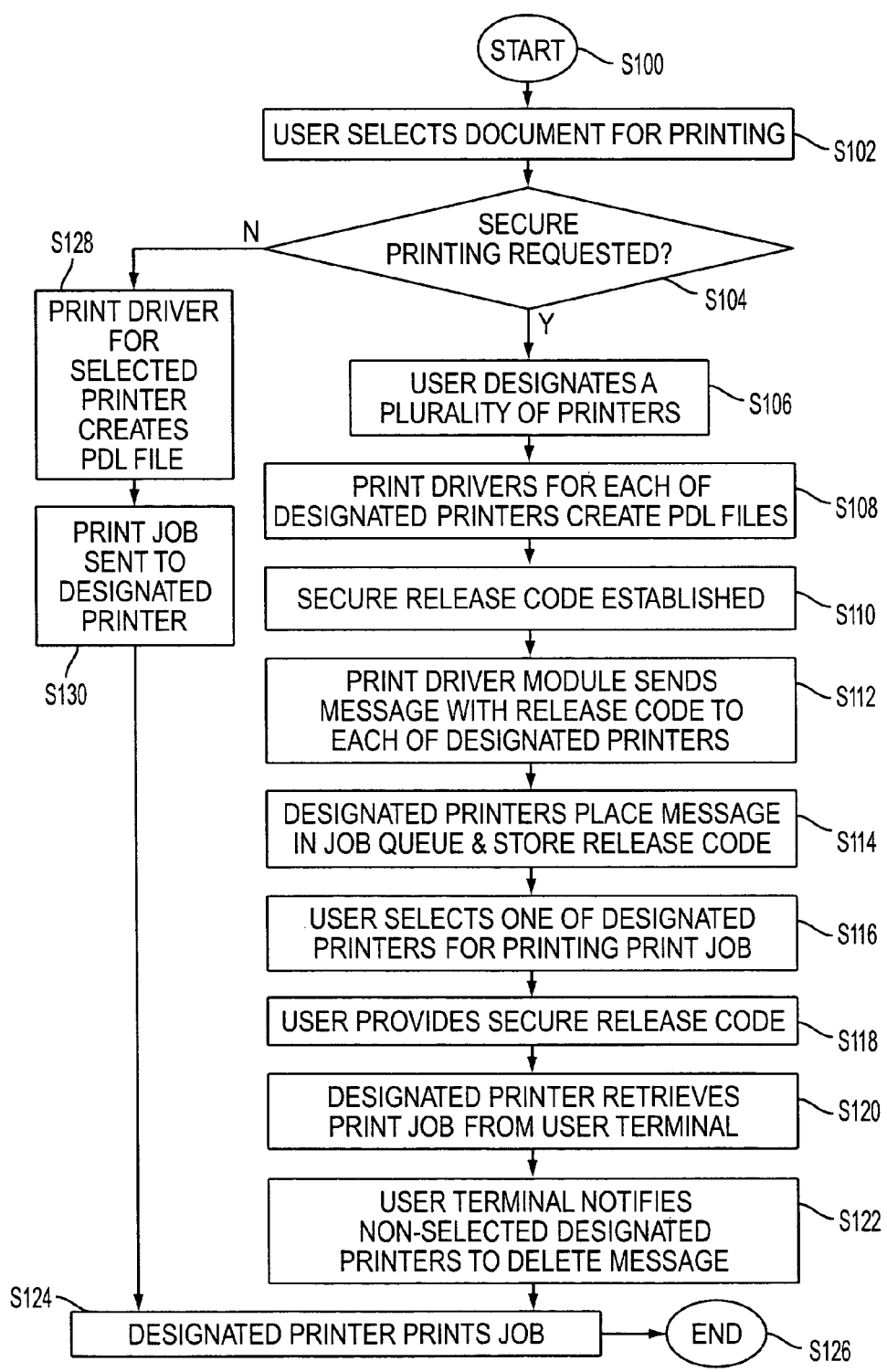
FIG. 3 is a flow diagram illustrating an exemplary method of secure printing which may be performed using the system of FIG. 1.

FIG. 3 illustrates an exemplary method of printing using a printing system such as the network printing system 10 of FIGS. 1 and 2. It will be appreciated that the method may include fewer, more, or different steps, and that the steps need not proceed in the order illustrated. The method begins at S100. At S102, the user selects a document to be printed. At S104, the user's terminal 12, e.g., via the user interface and display 24, and the software executing on the user terminal enables the user to select a secure printing mode or an unsecure printing mode (e.g., to opt to have the document placed in the job queue of a specific printer). If the user selects the secure printing mode, at step S106, the user may designate a plurality of printers (the "designated printers") from among those printers which are accessible from the user terminal 12 via the digital network 16. The print drivers for the designated printers create a print job PDL file (step S108) which is stored in memory 56 at the user terminal. In another embodiment, particularly when only a few printers are accessible to the user terminal, all of the accessible printers may be designated at step S106.

At step S112, a secure release procedure for subsequent release of the document is established. This may involve a secure release code being established. This may include the user selecting an alphanumeric string (a PIN number) or such a string being selected by the user terminal. As will be appreciated, at step S104, the user may simply enter the PIN number, indicating that the user wishes to employ the secure printing mode. In one embodiment, the code may be stored on a mobile device, such as a Universal Serial Bus (USB) device 80 with flash memory or a wireless device. The user may connect the USB device to a USB port of the user terminal to establish the password. At step S112, the print driver module communicates a request to each of the designated printers which identifies the print job. In particular, the print driver module sends a message 48 to each of the designated printers indicating that the printer has been designated for secure printing of the print job. At step S114, the designated printers treat the message like a normal print job and place it in the print queue. As will be appreciated, there is no print job at the printer at this stage for printing. The print job resides securely at the user's terminal 12 until released to a selected one of the printers. At step S116, the user selects one of the designated printers for rendering the print job. For example, the user may be at a meeting and select a designated printer close to the meeting room. Or, the user may be in another building where the document is requested. In yet another embodiment, the user may communicate the password to another user and identify a designated printer where the other user can print the document. At step S118, the predefined secure release procedure is executed at the selected printer. For example, the user (or the user's designate) provides the secure release code to the selected designated printer. When requesting the printing of the secure print job, the user may be asked to input the secure release code. For example, the user may enter the code via the printer keypad 54 or touch screen 52 or insert the USB device carrying the code into a USB port of the printer. In yet another embodiment, the user may interact wirelessly with the printer to select a job, e.g., via a cell phone, blue tooth device, dedicated transmitter, or the like, e.g., when the user is in close proximity to the printer. At step S120, the selected designated printer retrieves the document from the user's terminal. For example, the printer may confirm that the input secure release code corresponds with that sent in the message or may forward the secure release code input by the user at step S118 to the user terminal for confirmation. If the code is confirmed as being correct, in response to a request by printer 18, the user's terminal 12 sends the appropriate PDL file 58 to the printer 18. The PDL file is thus sent only to one printer. At step S122, the user's terminal notifies the other designated printers (printers 20 and 22 in this example) to which a message 48 was sent at step S112. These printers then delete the message from the job queue. The multiple print job files 58, 60, 62 may also be deleted from the memory 56 of the user's terminal. At step S124, the selected printer prints the print job using an appropriate marking engine. The method ends at step S124. Of course, if the user selects a conventional printing mode at step S104, the print driver module uses the print driver for the selected printer to create a single PDL file (step S126) and sends the print job to the single selected printer (S128) to print the job.

In order to retrieve the print job from the user's terminal, it is generally a requirement that the terminal remain on. If the user attempts to switch off the terminal while an unprinted job is being retained, the terminal may be programmed to warn the user (e.g., via a message displayed on the screen) that switching off the computer terminal will prevent the secure job from being printed. The user may be provided a choice of options such as leaving the terminal on (e.g., under a log-on password protection), deleting the job, or transferring the PDL files for the print-ready print job to another computer terminal or a server, or to a printer for printing. If the user selects to leave the computer on until the job is printed, the terminal may establish a monitoring applet which automatically shuts the terminal down once the PDL file has been sent to a printer and the other designated printers have been notified.

The method illustrated in FIG. 3 may be implemented in a computer program product that may be executed on a computer. The computer program product may be a computer-readable recording medium on which a control program is recorded, or may be a transmittable carrier wave in which the control program is embodied as a data signal.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A secure printing method comprising:
providing a user terminal with a user interface which enables a user to select a secure printing mode for printing a document, wherein in the secure printing mode, a secure print job stored in the user terminal is releasable through execution of a secure release procedure, comprising a secure release code, for printing at a selected one of a plurality of designated printers; and
when a user selects the secure printing mode, generating page description language data for the secure print job in a format compatible with the designated printers;
storing the page description language data at the user terminal;
if an attempt is made to switch off the user terminal before the secure print job has printed, providing a warning and providing for automatically switching off the user terminal after the user terminal has sent the secure print job page description language to the selected one of the designated printers;
communicating a request, which identifies the secure print job, to each of the designated printers, without sending the secure print job page description language data;
at each of the designated printers to which the request is communicated, prior to a user's selection of the one of the designated printers, storing information identifying the secure print job in the printer's print job queue, without the secure print job page description language data; and
after communicating the request to each of the plurality of designated printers and storing information identifying the secure print job in the print job queue of each of the designated printers, wherein when the predefined secure release procedure is executed at the selected one of the designated printers, the selected one of the designated printers forwards the secure release code to the user terminal, the user terminal responding by releasing the secure print job page description language data only to the selected one of the plurality of designated printers, the designated printers which are not selected receiving a notification causing the designated printers which are not selected to delete the information identifying the secure print job from their print job queues.

2. The method of claim 1, further comprising:
printing the document at the selected printer.

3. The method of claim 1, further comprising:
prompting a user to designate printers from a group of printers accessible to the user terminal.

4. The method of claim 1, further comprising:
designating a plurality of designated printers from a group of printers accessible to the user terminal via a network.

5. The method of claim 1, wherein the generating page description language data for the secure print job comprises generating page description language data in a plurality of page description language formats, each of the formats being compatible with at least one of the designated printers, the storing the page description language data at the user terminal including storing the page description language data in the plurality of formats.

6. The method of claim 1, wherein the execution of the secure release procedure at the selected one of the designated printers comprises inputting the secure release code to the selected printer.

7. The method of claim 6, further comprising retaining the secure print job at the user terminal until the secure release code is input.

8. The method of claim 6, wherein the secure release code is stored on a USB device and wherein execution of the secure release procedure includes connecting the USB device with the selected printer.

9. The method of claim 1, further comprising displaying the print job queue at the printer, whereby a user selects the secure print job for printing.

10. A computer program product comprising a non-transitory computer-readable recording medium which stores instructions for performing the method of claim 1.

11. A secure printing system which includes instructions stored in memory for performing the method of claim 1 and a processing device for executing the instructions.

12. The method of claim 1, further comprising providing for the user terminal to shut down automatically when the secure print job has been released to the designated printer.

13. A secure printing system comprising:
a user terminal; and
a group of printers in communication with the user terminal, each of the printers being capable of executing a print job, each of the printers including a print job retrieval module for receiving a request for secure printing of the print job from the user terminal, without page description language data of the secure print job, each of the designated printers storing information identifying the secure print job in the printer's print job queue, and for retrieving the print job from the user terminal in response to input of a secure release code;
wherein the user terminal comprises a user interface which enables a user to designate a plurality of the group of printers for secure printing by a selected one of the designated printers and to establish the secure release code and a print driver module which sends the request to each of the designated printers without the page description language data of the secure print job, the user interface further providing a warning to the user and providing for automatically switching off the user terminal after the user terminal has sent the secure print job page description language to the selected one of the designated printers if the user attempts to switch off the user terminal before the secure print job has printed, the print driver module sending page description language data to the selected one printer, of the designated printers which receives the secure release code, and sending a notification to the designated printers that are not the selected one, the notification causing the designated printers that are not the selected one to delete the identifying information from the respective designated printers.

14. The secure printing system of claim 13, wherein the print driver module comprises a plurality of print drivers each of the drivers being configured for generating page description language data in a format compatible with at least one of the designated printers, whereby page description language data is stored for each of the designated printers.

15. The secure printing system of claim 13, the user terminal further comprising:
    memory which stores the secure print job in a plurality of formats whereby for each of the designated printers, page description language data compatible with the designated printer is stored.

16. The secure printing system of claim 13, further comprising:
    a network which links the user terminal and the group of printers.

17. The secure printing system of claim 13, wherein at least one of the group of printers is remote from another of the group of printers.

18. A secure printing method comprising:
    providing a user terminal with a user interface which enables a user to select a secure printing mode for printing a document, wherein in the secure printing mode, a secure print job stored in the user terminal is releasable through execution of a secure release procedure, comprising a secure release code, for printing at a selected one of a plurality of designated printers; and
    when a user selects the secure printing mode, generating page description language data for the secure print job in a format compatible with the designated printers;
    storing the page description language data at the user terminal;
    providing a warning if an attempt is made to switch off the user terminal before the secure print job has printed;
    communicating a request, which identifies the secure print job, to each of the designated printers, without sending the secure print job page description language data;
    at each of the designated printers to which the request is communicated, prior to a user's selection of the one of the designated printers, storing information identifying the secure print job in the printer's print job queue, without the secure print job page description language data;
    after communicating the request to each of the plurality of designated printers and storing information identifying the secure print job in the print job queue of each of the designated printers, wherein when the predefined secure release procedure is executed at the selected one of the designated printers, the selected one of the designated printers forwards the secure release code to the user terminal, the user terminal responding by releasing the secure print job page description language data only to the selected one of the plurality of designated printers, the designated printers which are not selected receiving a notification causing the designated printers which are not selected to delete the information identifying the secure print job from their print job queues; and,
    if the user attempts to shut down the user terminal before releasing the secure print job, providing a choice of deleting the secure print job, shutting down the user terminal automatically when the secure print job has been released, transferring the secure print job page description language to another user terminal, and leaving the terminal on.

* * * * *